United States Patent Office 2,900,368
Patented Aug. 18, 1959

2,900,368

POLYURETHANES OF POLYALKYLENE ETHER-THIOETHER GLYCOLS

Frederic B. Stilmar, Wilmington, Del., assignor to E. I. du Pont de Nemours and Company, Wilmington, Del., a corporation of Delaware No Drawing. Application May 23, 1956
Serial No. 586,650

14 Claims. (Cl. 260—77.5)

This invention relates to elastomeric products of organic diisocyanates with polyglycols, and more particularly, polyglycols having both ether and thioether linkages between alkylene radicals in the molecule, and to polymers obtained by further reacting such condensation products to increase their molecular weight.

This application is a continuation-in-part of copending application, Serial No. 423,215, filed April 15, 1954, now abandoned.

Polyalkylene ether glycols have been condensed with organic diisocyanates and water, or other bifunctional active hydrogen compounds, to produce elastomers, but some of these are deficient in their resistance to swelling on extended contact with water or organic solvents. Caulking and sealing compounds obtained by condensation of certain thioplasts with organic diisocyanates are known but these compounds do not exhibit good elasticity.

An object of the present invention is to provide condensation polymers which exhibit good elasticity and resistance to the swelling effects of water and aliphatic hydrocarbon solvents. A further object is to provide highly useful elastomers from polyalkylene ether-thioether glycols. Another object is the provision of elastomers with improved low temperature properties. Other objects will appear as the description of the invention proceeds.

These and other objects of the following invention are accomplished by reactions involving a polyalkylene ether-thioether glycol having a molecular weight of at least 750, an organic diisocyanate and a chain-extending agent.

The term, polyalkylene ether-thioether glycol as used throughout the specification and claims refers to compounds containing terminal hydroxyl groups having both ether and thioether linkages between alkylene radicals in the molecule. These compounds may be represented by the formula, $HO(G-X)_pH$, wherein G is an alkylene radical having from 1 to 10 carbon atoms and X represents both oxygen and sulfur with the terminal X being oxygen, and $p$ is an integer greater than 1. In the polyether-thioethers useful in this invention, $p$ is sufficiently large that the glycol has a molecular weight of at least 750. In these glycols, not all of the alkylene radicals present need be the same. Typical of the numerous polyalkylene ether-thioether glycols which may be used are:

$HO(C_2H_4SC_2H_4OC_2H_4O)_pH$
$HO(C_2H_4SC_2H_4O)_pH$
$HO(C_2H_4SC_2H_4OC_2H_4OC_2H_4O)_pH$
$HO(C_2H_4SC_2H_4OC_3H_6O)_pH$
$HO(C_2H_4SC_4H_8SC_2H_4O)_pH$
$HO(C_2H_4SC_2H_4OC_{10}H_{20}O)_pH$

These glycols may be made by azeotropically distilling water from a mixture of a thioether glycol in which both hydroxyl groups are β to a sulfur atom and a glycol or glycol ether in the presence of a catalyst such as p-toluene sulfonic acid. The preparation of such polyalkylene ether-thioether glycols by this method is well known in the art. The sulfur content may be increased as the proportion of the thioether glycol increases. When thiodiglycol, $HOC_2H_4SC_2H_4OH$, is condensed with itself by this method, there is one sulfur and one oxygen in the repeating unit. Alternatively, bis-halogenothioethers may be reacted with the alkali salts of the glycols. Glycols with more than one sulfur may be used, for example, $HOC_2H_4SC_4H_8SC_2H_4OH$ may be made by condensing 1 mol of $ClCH_2CH_2CH_2CH_2Cl$ with two mols of $HOC_2H_4SNa$. This may then be condensed with itself or other glycols. When condensed with itself, the repeating unit has two sulfur and one oxygen units. By these methods of preparation, the terminal groups of these polyalkylene ether-thioether glycols are always hydroxyl groups. By suitable choice of glycols and thioglycols, the ratio of oxygen to sulfur may be varied widely. Polyalkylene ether glycols of higher molecular weight may be used, for example, a polytetramethylene ether glycol of molecular weight about 1000 can be condensed with the sulfur intermediate to give a polyalkylene ether-thioether glycol of molecular weight about 3000. A preferred range lies from about one oxygen to one sulfur to about fifteen oxygens to one sulfur. With higher proportions of sulfur, the polymers tend toward the plastic and with lower proportions of sulfur, the improvement in solvent-resistance and freeze-resistance due to the presence of the thioether group decreases. For purposes of the present invention, the polyalkylene ether-thioether glycols which may be used should have a molecular weight of from 750 to about 10,000. The molecular weights referred to herein are calculated from the hydroxyl numbers of the glycols and, therefore, represent number average values.

Any of a wide variety of diisocyanates may be employed to react with the polyalkylene ether-thioether glycols, including aromatic, aliphatic and cycloaliphatic diisocyanates and combinations of these types. Representative compounds include toluene-2,4-diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred. In general, they react more rapidly with the polyalkylene ether-thioether glycols than do the alkylene diisocyanates. Compounds such as toluene-2,4-diisocyanate in which the two isocyanate groups differ in reactivity are particularly desirable. The diisocyanates may contain other substituents, although those which are free from reactive group other than the two isocyanate groups are ordinarily preferred. In the case of the aromatic compounds, the isocyanate groups may be attached either to the same or to different rings. Dimers of the monomeric diisocyanates and di(isocyanatoaryl) ureas such as di(3-isocyanato-p-tolyl) urea, may be used.

The chain extending agent which is used in the preparation of the new elastomers of this invention is a compound containing a plurality of active hydrogen atoms capable of reacting with isocyanates, no more than two atoms in the molecule having active hydrogen attached thereto. Water is the cheapest and, in many cases, the most desirable chain extending agent. Hydrogen sulfide is another inorganic compound useful for this purpose. There may also be employed organic compounds containing two and only two atoms in the molecule to which are attached active hydrogen atoms. The term "active hydrogen atoms" refers to hydrogens which, because of their position in the molecule, display activity according to the Zerewitinoff test as described by Kohler in J. Am.

Chem. Soc. 49, 3181 (1927). In the chain extenders useful in this invention, the active hydrogen atoms are attached to oxygen, nitrogen or sulfur. The groups containing the active hydrogen will ordinarily be —OH, —SH, —NH—, —NH$_2$, —COOH, —CONH$_2$, —CONHR where R represents an organic radical, —SO$_2$OH, —SO$_2$NH$_2$, or —CSNH$_2$. The chain extending compound may be aliphatic, aromatic or cycloaliphatic or of mixed type. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-amino-benzoic acid, m-phenylenediamine, propylenediamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylenediamine, succinic acid, succinamide, 1,4-butanedisulfonamide, 2,4-tolylenediamine, bis(4-aminophenyl) methane, β-hydroxypropionic acid and 1,2-ethanedisulfonic acid. Compounds containing at least one amino group are the preferred organic chain extending agents. It is to be understood that for purposes of the present invention, these organic compounds may be used either singly or in combination, or in combination with water.

The elastomeric products of the present invention may be prepared by several general procedures. In one method, a molar excess of an organic diisocyanate is mixed with the polyalkylene ether-thioether glycol in suitable mixing equipment at a temperature which is preferably from 70–120° C. but which may range from about 50–150° C. The molar ratio of diisocyanate to glycol is preferably between 1.1:1 and 12:1. If the molar ratio of diisocyanate to glycol is close to unity or when the molecular weight of the glycol is very high, the reaction mass may become quite viscous and heavy-duty mixing equipment may be required. Accordingly, the reaction may be carried out in a Werner-Pfleiderer mixer. The resulting product at this stage of the reaction is a linear intermediate isocyanate-terminated polymer containing urethane linkages. The product may be represented by the formula

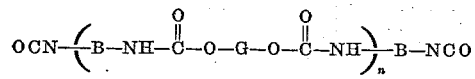

wherein B is a bivalent organic radical which is derived from the organic diisocyanate and is, therefore, inert to isocyanate groups; O—G—O is a bivalent radical resulting from removal of the terminal hydrogen atoms from a polyalkylene ether-thioether glycol; and $n$ is an integer greater than zero. With a molar ratio of diisocyanate to glycol of 2:1, $n$ in the above formula is 1; however, as the molar ratio of diisocyanate to glycol approaches unity, $n$ will be a very large number. With molar ratios of diisocyanate to glycol exceeding 2:1, there will, of course, be some unreacted diisocyanate left in the reaction mixture.

This isocyanate-terminated polymer may then be reacted with a chain extending agent so as to provide highly useful elastomers. The chain extending agent serves to link the isocyanate-terminated polymer units together so as to lengthen the polymer chain and also to provide active hydrogen atoms which serve as potential curing or cross-linking sites. This reaction of the chain extending agent with the isocyanate-terminated polymer may be carried out in heavy-duty mixing equipment, such as a Werner-Pfleiderer mixer at temperatures of from about 70–150° C. As the isocyanate-terminated polymer is chain extended, it forms a tough, rubbery clump which begins to pull away from the mixer and which may then be removed from the mixer and worked on a rubber mill to form a smooth band. The amount of chain extending agent which is used is not critical. An amount less than that theoretically required to react with all of the isocyanate groups of both the isocyanate-terminated polymer and any free unreacted diisocyanate which may be present may be used, in which case, the resulting elastomer will have free isocyanate groups. In this case, the elastomer may be molded and cured directly or may be stabilized against premature curing by the addition of small amounts of a nitrogen base containing at least one hydrogen atom attached to nitrogen. When stabilized in this manner, the reaction product may be stored for extended periods before curing. If an amount of chain extending agent is used which is equivalent to that theoretically required to react with all of the isocyanate groups or if an excess over this amount is used, the resulting reaction product will be stable and will not cure until an additional di- or triisocyanate or other curing agent is added. In any event, the amount of chain extending agent and molar ratio of organic diisocyante to the polyalkylene etherthioether glycol used should be selected so that the residues resulting from the glycol comprise at least 35% of the total weight of the product.

As mentioned above, the isocyanate-terminated polymer is reacted with the chain extending agents containing active hydrogen. The reactions of isocyanates with the active hydrogen containing groups present in the various typical chain extending agents are described in the literature as proceeding as follows:

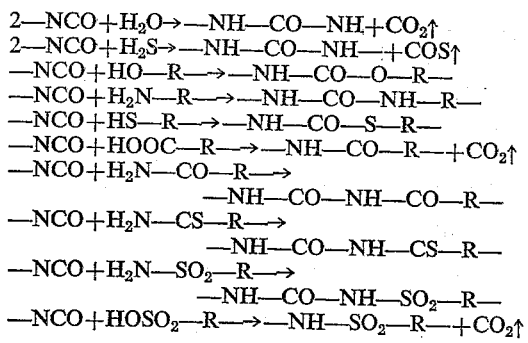

It is apparent from the foregoing table that when water and hydrogen sulfide are used as chain extenders, there is a carbonyl linking group between the imino groups, which imino groups are attached to the isocyanate residues. When the other typical chain extenders are used, an acyl radical is attached to the imino group. Thus, when these other typical chain extenders react with two free isocyanate groups of the isocyanate-terminated polymer units and, if present, molecules of the original diisocyanate, a diacyl radical is the connecting radical between the imino groups which are attached to the isocyanate residues. These diacyl radicals are hereinafter referred to by the letter "Q."

After reaction of the chain extending agents with the isocyanate-terminated polymer and any excess diisocyanate which may be present, the resulting product is a polymer consisting essentially of structural units having the formula

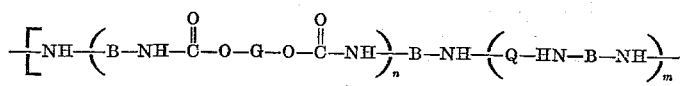

wherein O—G—O is a bivalent radical resulting from removal of the terminal hydrogen atoms from a polyalkylene etherthioether glycol; B is a bivalent organic radical; Q is a radical selected from the group consisting of a carbonyl radical and a diacyl radical; $n$ is an integer greater than zero; and $m$ is an integer including zero;

each of the said structural units being connected to the next by a radical Q, having the significance defined above.

The product which is obtained after reaction of the isocyanate-terminated polymer with the chain extending agent may be cured to provide a highly useful elastomer. If all of the isocyanate groups have been reacted with the chain extending agent, the polymer may be cured by the addition of a curing agent such as an organic diisocyanate. Representative compounds which may be used include toluene-2,4-diisocyanate, the dimer of toluene-2,4-diisocyanate, 4,4'-methylenedi-o-tolylisocyanate and 1,3-bis(3-isocyanato-4-methylphenyl) urea. In the curing of these elastomers from about 1 to 20 parts of curing agent per 100 parts of polymer is sufficient at temperatures of about 100–150° C.

While the preparation of the highly useful elastomers of the present invention has been described by the reactions of a molar excess of an organic diisocyanate with a polyalkylene ether-thioether glycol, followed by reaction with a chain extending agent, it is to be understood that these elastomers may be prepared by adding all of the reactants at once. Alternatively, the chain extender may first be reacted with the organic diisocyanate and this reaction product be mixed with either the polyalkylene ether-thioether glycol or the reaction product of the glycol with additional organic diisocyanate. It is also to be understood that the elastomeric reaction products of the present invention may be prepared by first reacting the polyalkylene ether-thioether glycol with phosgene to form a bischolorformate ester and then reacting this product with an organic diamine and additional phosgene to produce the desired elastomer.

When the elastomeric reaction products of the present invention are prepared by first reacting a molar excess of an organic diisocyanate with a polyalkylene ether-thioether glycol, this reaction may be controlled by the presence of small amounts of an acid reacting compound, such as an acid chloride. When the resulting isocyanate-terminated polymer is reacted with a chain extending agent, the reaction may be accelerated by the presence of the acid salt of an organic tertiary nitrogen or phosphorus base.

The following examples will better illustrate the nature of the present invention; however, the invention is not intended to be limited to these examples. Parts are by weight unless otherwise indicated.

*Example 1*

A polymeric glycol containing repeating units of the structure —[CH$_2$CH$_2$SCH$_2$CH$_2$OCH$_2$O]$_x$— terminated in —OH groups was prepared as follows: 400 parts thiodiglycol, 100 parts paraformaldehyde, 200 parts benzene and 1 part p-toluene sulfonic acid were mixed together an azeotropically distilled until 65 parts of water had been removed. The reaction mass was then steam distilled to remove excess p-formaldehyde. The oily product was separated from the water and dried first by azeotropic distillation with benzene and finally by heating to 150° C. at 1 mm. pressure. The molecular weight of the glycol thus obtained was 1500 as calculated from the hydroxyl number of 73.7.

90 parts of the glycol thus obtained and 60 parts of toluene-2,4-diisocyanate were mixed and heated at 100° C. for thirty minutes. The reaction mixture was then transferred to a Werner-Pfleiderer mixer and 1 part of pyridine was added followed by 6.3 parts of water. After mixing at 100° C. for 30 minutes, a waxy crumb resulted. This was removed from the mixer and cured in a press at 130° C. under pressure for 30 minutes. A smooth amber slab was obtained which showed a tensile strength of 3000 lbs. per sq. in., an elongation at the break of 105%, a volume swell after 7 days of exposure at room temperature in water of 1.28% and in N-hexane of 1.42%. Bureau of Standards abrasion test was 119%.

*Example 2*

A polymeric glycol containing repeating units of the structure —[CH$_2$CH$_2$SCH$_2$CH$_2$O]$_x$— terminated in —OH groups was prepared by azeotropically distilling the following charge: 488 parts of thiodiglycol, 90 parts toluene, 17 parts p-toluene sulfonic acid. After 70 parts of water had been removed, the product was isolated and dried by the procedure described in Example 1. The yield of waxy glycol was 184 g. which had a hydroxyl number of 33. The molecular weight was calculated from this to be 3360. Analysis showed 29.9% sulfur.

50 parts of the glycol thus prepared was mixed with 25 parts of toluene-2,4-diisocyanate and 0.1 part of p-toluene sulfonyl chloride and heated to 100° C. for 30 minutes. To the mass was then added 0.4 part of pyridine and 2.5 parts of water with stirring and the viscous syrup was heated at 80° C. for a further ½ hour. The resulting plastic mass was sheeted on a rubber mill and formed a smooth band. It was then cured in a press at 130° C. for 30 minutes under pressure. An eleastomeric plastic of the following properties was obtained: tensile strength, 1400 lbs. per sq. in.; elongation at the break, 100%.

*Example 3*

A polymeric glycol containing repeating units of the structure —[CH$_2$CH$_2$SCH$_2$CH$_2$OCH$_2$CH$_2$O]$_x$— terminated in —OH groups was prepared by azeotropically distilling the following charge: 305 parts thiodiglycol, 155 parts ethylene glycol, 90 parts toluene, 18 parts p-toluene sulfonic acid. After 110 parts of water had been removed, the product was isolated and dried by the procedure of Example 1. The yield of glycol was 105 parts. The hydroxyl number was 21.6 which indicated a molecular weight of 5200. The percent sulfur was 22.6.

91 parts of the glycol thus prepared was mixed with 40 parts of toluene-2,4-diisocyanate and heated to 100° C. for 1 hour. The charge was then transferred to a Werner-Pfleiderer mixer. To it were added 0.8 part of pyridine and 4.2 parts of water. Milling was continued at about 80–85° C. After 40 minutes, a waxy crumb formed. The crumb was removed from the mixer and milled on a rubber mill to form a smooth sheet. This material was then put in a press and cured for 30 minutes at 130° C. to give an amber slab which had a tensile strength of 2000 lbs. per sq. in. and an elongation at the break of 300%. It had only a negligible swelling after immersion in water for 4 days.

*Example 4*

A polymeric glycol containing repeating units of the structure

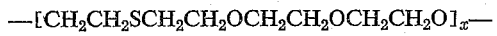
—[CH$_2$CH$_2$SCH$_2$CH$_2$OCH$_2$CH$_2$OCH$_2$CH$_2$O]$_x$— terminated in —OH groups was prepared by azeotropically distilling the following charge: 305 parts thiodiglycol, 263 parts diethylene glycol, 150 parts toluene, 17 parts p-toluene sulfonic acid. After 86 parts of water had been removed, the product was isolated and dried by the same procedure as in Example 1. The yield was 242 parts of a glycol with a hydroxyl number of 33.8 which gave a calculated molecular weight of 3300. The analysis for sulfur was 17.2%.

50 parts of the polyethylene ether-thioether glycol thus prepared was mixed with 26 parts of toluene-2,4-diisocyanate and 0.2 part of p-toluene sulfonyl chloride and heated at 100–110° C. for 2 hours. Then 0.5 part of pyridine and 2.7 parts of water were added and the charge was heated at 80° C. for 15 minutes. The product was then sheeted out on a rubber mill to form a smooth band. This was then placed in a press and cured at 130° C. under pressure for 30 minutes. The elastomer had the following properties: tensile strength, 3500 lbs. per sq. in.; elongation at the break, 500%.

Example 5

A polymeric glycol having repeating units of the following structure

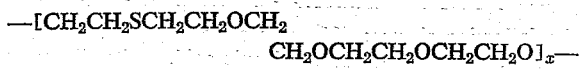
—[CH₂CH₂SCH₂CH₂OCH₂
CH₂OCH₂CH₂OCH₂CH₂O]ₓ— terminated in —OH groups was prepared by azeotropic distillation of the following charge: 305 parts thiodiglycol, 375 parts triethylene glycol, 150 parts toluene, 17 parts p-toluene sulfonic acid. After 87 parts of water had been removed, the product was isolated and dried by the same procedure as in Example 1. The yield was 98 parts of a glycol having a hydroxyl number of 33.1 which indicated a molecular weight of 3400. The percent sulfur in the product was 13.5.

90 parts of the glycol thus prepared and 45 parts of toluene-2,4-diisocyanate were mixed and heated to 100° C. for 2 hours. There were then added 1 part of pyridine and 4.7 parts of water. The charge was transferred to a Werner-Pfleiderer mixer and worked at 80° C. until a tough crumb formed. This crumb was then transferred to a rubber mill and homogenized to form a smooth sheet. This product was then cured at 130° C. for 30 minutes in a mold under pressure. It gave an elastomer of the following properties: tensile strength, 2170 lbs. per sq. in.; elongation at the break, 300%; linear swell in cold water after 4 days, 12%.

Example 6

A polymeric glycol containing repeating units of the probable structure

—[CH₂CH₂SCH₂CH₂OCH₂CH₂CH₂CH₂O]ₓ— and having terminal —OH groups was prepared by azeotropic distillation of the following charge: 244 parts thiodiglycol, 180 parts butane-1,4-diol, 100 parts toluene, 5 parts p-toluene sulfonic acid. After removing 71 parts of water, the product was isolated and dried by the procedure of Example 1. The yield of polyglycol was 280 parts, having a hydroxyl number of 43. The molecular weight calculated from this was 2600.

100 parts of this glycol and 52 parts of toluene-2,4-diisocyanate were mixed and heated at 100° C. for 1 hour. The charge was then transferred to a Werner-Pfleiderer mixer and 0.8 part of pyridine and 5.4 parts of water were added. After a few minutes milling, a crumb formed which was transferred to a rubber mill and formed into a smooth sheet. This material was then cured by heating in a press at 130° C. for 30 minutes. The amber colored elastomer had the following properties: tensile strength at the break, 2200 lbs. per sq. in.; elongation at the break, 100%.

Example 7

One mol of polyalkylene ether-thioether glycol (having a molecular weight of 2490, OH No. 45 and 16.2% sulfur and made by the procedure of Example 4 from 1 mol of thiodiglycol and 1 mol diethylene glycol) was stirred with 1.7 mols of hexamethylene diisocyanate at 120–125° C. for 1 hour. The mass was cooled to about 95° C. and 0.37 mol of water was added and stirring was continued for 10 minutes. The resulting gummy mass was spread on a waxed pan and heated in an oven at 105–110° C. for 2 hours. A rubbery mass resulted. This was milled on a rubber mill to a band and 0.9 part of piperidine per 100 parts of polymer was milled in to stabilize the polymer.

Then 100 parts was sheeted out on a rubber mill and 5 parts of N,N'-bis(3-isocyanato-4-methylphenyl) urea was thoroughly milled in. A portion was put in a mold and cured at 270° F. for 30 minutes in a press. A soft, low-modulus elastomer was obtained.

Example 8

One mol of the polyalkylene ether-thioether glycol of Example 7 was stirred with 2.1 mols of naphthalene-1,5-diisocyanate at 115° C. for 10 minutes when it became very viscous. 0.66 mol of water was then mixed in and the mass was transferred to a rubber mill and milled until uniform. There was then added 1.0 part of piperidine per 100 parts of polymer and the polymer was milled further to stabilize it against precuring.

100 parts of the stabilized polymer was milled on a rubber mill with 5 parts of N,N'-bis(3-isocyanato-4-methylphenyl) urea and a portion was placed in a mold and cured by heating in a press at 270° F. for 30 minutes. The resulting rubbery slab had a tensile strength of 1100 lbs. per sq. in., a modulus at 300% elongation of 600 lbs. per sq. in., and an elongation at the break of 700%.

Example 9

A mixture of 366 parts of thiodiglycol, 270 parts of tetramethylene glycol, 132 parts of benzene and 9 parts of p-toluene sulfonic acid was azeotropically distilled, the water layer being separated and the benzene being returned to the distillation. Approximately 106 parts of water layer contaminated with some glycol was separated. The benzene solution of the polyalkylene ether-thioether glycol was then boiled with 10% sodium carbonate solution, washed with water and finally freed from solvent and water by heating at 110° C. under about 1 mm. pressure. There resulted 366 parts of polyether-thioether glycol with a hydroxyl number of 64.5 and a molecular weight of 1735.

86.8 parts of the above polyalkylene ether-thioether glycol and 11.6 parts of toluene-2,4-diisocyanate were heated and mixed in a Werner-Pfleiderer mixer for 2 hours at 80° C. and then 2 hours at 130° C. The temperature was reduced to 100° C. and 1.83 parts of 2,4-tolylenediamine was added and mixing was continued for 10 minutes. A soft, rubbery plastic resulted. This was cured by milling on a rubber mill with 4 parts of N,N'-bis(3-isocyanato-4-methylphenyl) urea per 100 parts of polymer until a homogeneous mass was formed and then curing in a mold at 134° C. for 30 minutes under pressure. A resilient, rubbery slab was obtained. It did not freeze (or crystallize) on being held for 2 weeks at —20° C.

Example 10

86.8 parts of the polyalkylene ether-thioether glycol prepared in Example 9 and 4.61 parts of toluene-2,4-diisocyanate were heated and mixed in a Werner-Pfleiderer mixer at 110° C. for 2 hours. The mass was cooled to 80° C. Then 0.14 part of water was added and mixing was continued at 80° C. for 30 minutes. 10 parts of toluene-2,4-diisocyanate was added and mixing was continued a further 2 hours at 80° C., after which 3.15 parts of water was added and mixing was continued for 45 minutes while the temperature was increased to 100° C. The mass was removed from the mixer and put on a rubber mill where 0.25 part of piperidine was added to stabilize it.

100 parts of this polymer were milled on a rubber mill with 4 parts of N,N'-bis(3-isocyanato-4-methylphenyl) urea and then cured in a mold under pressure for 30 minutes at 134° C. The resulting soft, rubbery slab was not frozen when kept at —20° C. for 2 weeks; that is, it still showed characteristic rubbery properties at —20° C.

Example 11

A polyether-thioether glycol was made by azeotropically distilling a mixture of 4.49 mols of thiodiglycol and 4.49 mols of propane-1,2-diol in 180 parts of benzene with 13.5 parts of p-toluene sulfonic acid monohydrate until about 80% of the theoretical amount of water had been distilled over, the benzene being returned to the reaction vessel. Then an additional 0.67 mol of thiodiglycol was added and the reaction completed. The crude ether was worked up in the same way as that of Example 9. There was obtained 667 parts of a polyether-thioether glycol having a molecular weight of 926 as determined by OH number. The sulfur content was 21.7%.

278 parts of the polyalkylene ether-thioether prepared above was mixed with 36 parts of toluene-2,4-diisocyanate and heated at 100° C. for 3 hours while agitating. The mass was cooled to 60° C. and an additional 36 parts of toluene-2,4-diisocyanate was added and stirring was continued for 18 hours, at 60° C. To the prepolymer at room temperature was then added 1325 parts of dry tetrahydrofuran and the mass was stirred until it was completely in solution. Then 18 parts of water was thoroughly stirred in and the solution was allowed to stand at room temperature for 136 hours for chain extension to take place. The tetrahydrofuran was then evaporated.

100 parts of the polymer was compounded on a rubber roll mill with 15 parts of high abrasion furnace black, 8 parts of 1,3-bis(3-isocyanato-p-tolyl) urea and 0.5 part of 2-mercaptobenzimidazole and then cured in a mold in a press at 134° C. for 30 minutes. After standing for 2 weeks the elastomer had the following properties at 25° C.: tensile strength at the break, 2350 lbs. per sq. in.; modulus at 300% elongation, 1730 lbs. per sq. in.; elongation at the break, 370%.

*Example 12*

A tetramethylene ether-thiodiglycol polyether glycol was prepared by azeotropically distilling a mixture of 604 parts of thiodiglycol, 405 parts of 1,4-butanediol, 13.5 parts of p-toluene sulfonic acid monohydrate and 210 parts of benzene, separating the water and returning the benzene to the reaction vessel. Distillation was continued to a pot temperature of 168° C. and 174 parts of water had distilled over. The crude polyether-thioether was worked up as in Example 9 to yield 612 parts of a viscous liquid analyzing 20.1% sulfur and having a molecular weight of 2285 as determined by hydroxyl number.

228.5 parts of the polyether was then mixed with 36.3 parts of toluene-2,4-diisocyanate and stirred at 60° C. for 18 hours. Then 1120 parts of dry tetrahydrofuran was added to the cooled prepolymer and 17.3 parts of water was thoroughly stirred into solution. After standing for 66 hours for chain extension to take place, the solvent was evaporated.

100 parts of the polymer was compounded on a rubber roll mill with 10 parts of 1,3-bis(3-isocyanato-p-tolyl) urea and cured in molds in a press at 134° C. for 30 minutes. After standing for 14 days, the elastomer had the following properties at 25° C.: tensile strength at the break, 1150 lbs. per sq. in.; modulus at 300% elongation, 640 lbs. per sq. in.; elongation at the break, 670%.

When similarly compounded with 8 parts of 1,3-bis(3-isocyanato-p-tolyl) urea and cured, the elastomer did not freeze after 7 days at −20° C. and showed a T-50 value of −41° C. (A.S.T.M. test D-599-40T).

*Example 13*

A polyalkylene ether-thioether glycol of the general formula

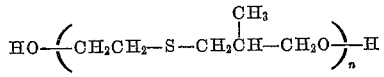

was prepared by first condensing mercaptoethanol with methallyl alcohol and then polymerizing.

298 parts of distilled methallyl alcohol was placed in a vessel under an atmosphere of nitrogen. 1 part of azobisisobutyronitrile was added and the solution heated to 60° C. Then 343 parts of distilled mercaptoethanol was added while agitating over a period of 1 hour during which the temperature increased to about 80–85° C. After the addition was complete, stirring was continued 30 minutes at 80–83° C. and then an additional 15 minutes at 100° C.

The mass was then distilled, 554 parts of the mercaptoethanol-methallyl alcohol adduct being obtained at 128–132° C. at a pressure of 1.2–1.5 mm. of mercury.

500 parts of this adduct was dissolved in 500 parts of dry xylene and 4.5 parts of concentrated sulfuric acid was added. The mixture was azeotropically distilled, the water being separated and the xylene returned to the reaction vessel. The temperature in the pot gradually rose from about 120° C. to about 145° C. and 93 parts of water was distilled off. The solution was cooled to below 100° C. and 500 parts of water and 20 parts of phenyl-β-naphthylamine were added and the mass stirred. It was then heated to reflux for 2 hours. The water layer was discarded and the oil layer washed with warm water until it was free of acid. The oil layer was dried over anhydrous sodium sulfate and filtered. There was then added 15 parts of lime and 15 parts of activated charcoal with agitation and the solution filtered again. The xylene was then removed by distillation under vacuum. 421 parts of a colorless, polyether-thioether glycol was obtained which had a molecular weight of 1450 by hydroxyl number determination.

149 parts of the polyether-thioether glycol containing 0.04 mol percent water was stirred with 26.8 parts of toluene-2,4-diisocyanate at 60° C. for 18 hours. The cooled prepolymer was then dissolved in 500 parts of dry tetrahydrofuran and 5.4 parts of water was thoroughly stirred in. After standing at room temperature for 3 days, the tetrahydrofuran was evaporated.

100 parts of the elastomer was compounded on a rubber mill with 10 parts of 1,3-bis(3-isocyanato-p-tolyl) urea and cured in molds in a press at 134° C. for 30 minutes. The soft, resilient elastomer had a T-50 value of −30° C. and showed a weight gain of only 0.71% after immersion in water at 30° C. for 7 days and 0.68% after similar exposure to octane.

The present invention represents a distinct advantage in the art since the elastomers herein disclosed have good tensile strength, elasticity, and further have the advantage that they may be fabricated into sheets, rods, tubings and the like. They also retain their elastomeric character at low temperatures. The products of the invention have good resistance to swelling by water and aliphatic hydrocarbon solvents. Products fabricated from the herein disclosed polymers are particularly useful in preparing articles and appliances used in the automotive, aeronautical and petroleum industries, where pipelines, gaskets, and other objects prepared from such polymers are in constant contact with hydrocarbon solvents and oils. The products may also be used for coating fabrics, molding solid articles, forming sheets and as abrasion-resistant coating compositions. When used for coating, the isocyanate-terminated polymer may be dissolved in a volatile solvent and spread over the surface. After the solvent has evaporated, the polymer may be heated to cure it or it may be allowed to cure slowly at room temperature. If water is to be used as the chain extending agent, the moisture of the air is suitable, particularly under high relative humidity conditions. Chain extending agents and curing agents may be incorporated in the coating composition as desired. Also, pigments, plasticizers, and other modifying agents may be incorporated in the composition.

It is apparent that many widely different embodiments of this invention may be made without departing from the spirit and scope thereof and, therefore, it is not intended to be limited except as indicated in the appended claims.

What is claimed is:

1. A polymer consisting essentially of structural units having the formula

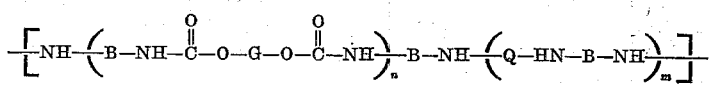

wherein O—G—O is a bivalent radical resulting from removal of the terminal hydrogen atoms from a polyalkylene etherthioether glycol having a molecular weight of at least 750, said glycol having a ratio of ether oxygen atoms to sulfur atoms of from about 1:1 to 15:1; B is a bivalent organic radical, said radical being inert to isocyanate groups; Q is a radical selected from the group consisting of a carbonyl radical and a diacyl radical; $n$ is an integer greater than zero; and $m$ is an integer including zero; each of the said structural units being connected to the next by a radical Q, having the significance defined; the overall ratio of the number of B to O—G—O radicals in the polymer being between 1.1:1 and 12:1 with at least 35% of the total weight of the polymer being the bivalent radicals O—G—O.

2. The polymer of claim 1 wherein the bivalent radical O—G—O results from removal of the terminal hydrogen atoms from a polyalkylene ether-thioether glycol, said glycol being the condensation product of thiodiglycol and butane-1,4-diol and having a ratio of ether oxygen atoms to sulfur atoms of from about 1:1 to 15:1.

3. The polymer of claim 1 wherein the bivalent organic radical B is an arylene radical.

4. The polymer of claim 2 wherein B is a 2,4-tolylene radical.

5. The polymer of claim 4 wherein Q is a carbonyl group.

6. The polymer of claim 4 wherein Q is the diacyl radical

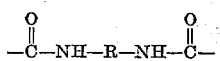

wherein —NH—R—NH— is an organic radical resulting from removal of terminal hydrogen atoms from an organic diamine.

7. A cured elastomer obtained by reacting the polymer of claim 1 with an organic polyisocyanate.

8. A polymer having the formula

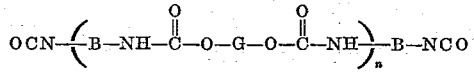

wherein O—G—O is a bivalent radical resulting from removal of the terminal hydrogen atoms from a polyalkylene etherthioether glycol having a molecular weight of a tleast 750, said glycol having a ratio of ether oxygen atoms to sulfur atoms of from about 1:1 to 15:1; B is a bivalent organic radical, said radical being inert to isocyanate groups; and $n$ is an integer greater than zero.

9. The polymer of claim 8 wherein the bivalent organic radical B is a 2,4-tolylene radical.

10. The process for preparing a polymer of claim 8 which comprises reacting a polyalkylene ether-thioether glycol having a molecular weight of at least 750, said glycol having a ratio of ether oxygen atoms to sulfur atoms of from about 1:1 to 15:1, with a molar excess of an organic diisocyanate.

11. The process of preparing a polymer of claim 1 which comprises reacting a polyalkylene ether-thioether glycol having a molecular weight of at least 750, said glycol having a ratio of ether oxygen atoms to sulfur atoms of from about 1:1 to 15:1, with a molar excess of an organic diisocyanate and further reacting the resulting isocyanate-terminated polymer with a chain extending agent having a plurality of active hydrogen atoms capable of reacting with isocyanates, no more than two atoms in the molecule of the said chain extending agent having active hydrogen attached thereto, said chain extending agent being selected from the group consisting of water, hydrogen sulfide and organic compounds containing two functional groups in the molecule to which are attached active hydrogen atoms.

12. The process of claim 11 wherein the organic diisocyanate is an arylene diisocyanate.

13. The process of claim 12 wherein the chain extending agent is water.

14. The process of claim 12 wherein the chain extending agent is an organic diamine.

References Cited in the file of this patent

UNITED STATES PATENTS

| | | |
|---|---|---|
| 2,216,044 | Patrick | Sept. 24, 1940 |
| 2,518,245 | Morris et al. | Aug. 8, 1950 |
| 2,606,173 | Fettes | Aug. 5, 1952 |
| 2,692,873 | Langerak et al. | Oct. 26, 1954 |
| 2,692,874 | Langerak | Oct. 26, 1954 |
| 2,853,472 | Schroeder et al. | Sept. 23, 1958 |

FOREIGN PATENTS

| | | |
|---|---|---|
| 894,134 | France | Dec. 14, 1944 |